Feb. 19, 1929.

J. R. DEWAR 1,702,724

BATTERY CHARGING SYSTEM

Filed Aug. 11, 1926

Inventor:
James R. Dewar
by his attorney
Farnum F. Dorsey

Patented Feb. 19, 1929.

1,702,724

UNITED STATES PATENT OFFICE.

JAMES R. DEWAR, OF ROCHESTER, NEW YORK, ASSIGNOR TO NORTH EAST ELECTRIC COMPANY, OF ROCHESTER, NEW YORK, A CORPORATION OF NEW YORK.

BATTERY-CHARGING SYSTEM.

Application filed August 11, 1926. Serial No. 128,679.

This invention relates to systems of the kind in which a storage battery, for supplying current at relatively low voltage is charged automatically, as and when necessary, be energy from a high-tension supply such as a direct or alternating current lighting system.

One object of the invention is to provide a system in which the high-tension current is excluded, as far as possible, from the controlling apparatus, and to this end the relays by which the charging of the battery is controlled are arranged to be energized by current from the battery rather than from the high-tension line or the charging circuit.

Another object of the invention is to provide means for giving a signal in case of a failure of E. M. F. in the charging line at a time when the battery charge is depleted and recharging should take place. To this end means are provided for operating such signal upon the simultaneous occurrence of low E. M. F. across the battery terminals and absence of current through the charging-circuit.

Figure 1:
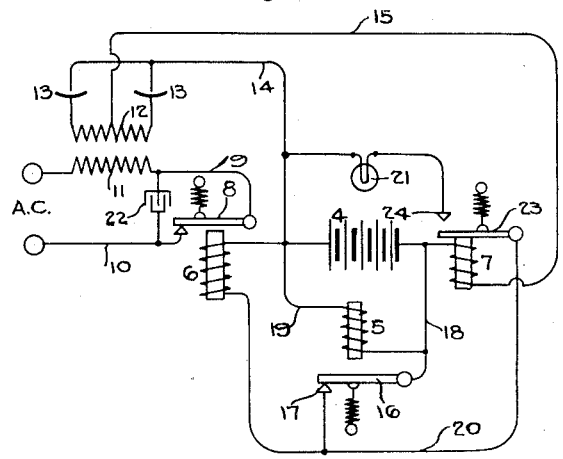
Figure 2:
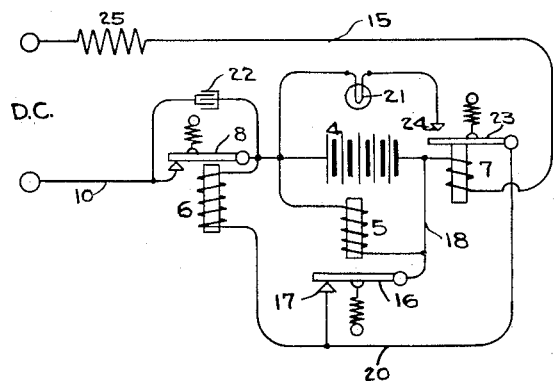

In the accompanying drawings Fig. 1 is a diagrammatic representation of a system embodying the present invention, as adapted for use with a source of alternating current supply, and Fig. 2 is a diagram of the system as modified for use with a direct-current supply.

In the illustrated embodiments of the invention the charging of the battery 4 is controlled primarily by a relay 5 having a winding, preferably of high resistance, which is connected across the battery terminals so that this relay is sensitive to changes in the terminal voltage of the battery. The voltage relay controls a second relay 6 which acts to open and close the connections between the battery and the source of energy. A third relay 7 controls, jointly with the relay 5, the signal hereinbefore referred to.

The cut-out relay 6 has an armature 8 which is biased to open-circuit position. This armature is connected in series with the source of energy and with the primary winding 11 of a transformer by which the necessary reduction in E. M. F. is secured. The secondary winding 12 is connected through rectifiers 13, in the usual manner, with conductors 14 and 15 connected with the battery terminals.

The armature 16 of the voltage relay is biased to engage a fixed contact 17, and this relay is adjusted to hold its armature in open-circuit position so long as the E. M. F. of the battery is at a point indicating a condition of full or nearly full charge. When the E. M. F. falls below this point the armature 16 engages the contact 17, and thereby closes a circuit through which current flows, by the way of a wire 18, from the battery through the winding of the cut-out relay. The latter thereupon closes the primary circuit of the transformer. When the E. M. F. across the battery terminals indicates a fully charged condition the voltage relay raises its armature and deenergizes the cut-out relay, which thereupon releases its armature and the transformer circuit is automatically opened.

To minimize sparking at the contacts of the cut-out relay, a condenser 22 is connected across the wires 10 and 19 through which the relay is connected with the source of energy.

The signal hereinbefore referred to may be located at any convenient point, and it is illustrated as a lamp 21. The armature 23 of the signal relay 7 is connected, through a wire 20, with the fixed contact of the voltage relay 5. This armature 23 is biased to engage a fixed contact 24, but the winding of the signal relay is connected in series with the wire 15 and the battery, so that the armature is held in open circuit position whenever charging of the battery is taking place.

So long as the armature of the voltage relay is held in open-circuit position, indicating that the battery is charged, no current can flow to the contacts of the signal relay. On the other hand, even if the battery charge be low, no current can flow through these contacts if the battery be under charge, since the contacts will then be held open. But if the battery charge be low, and yet no current flows through the charging circuit, current will then flow from the battery through the wire 18, the contacts of the voltage relay, the wire 20, the contacts of the signal relay, and thus to the signal lamp, which will continue to glow until normal conditions are restored in the transmission line from which the battery is charged.

Where a direct-current source of energy is used, the cut-out relay is connected directly in series with the battery, as shown in Fig. 2, but the connections of the system are otherwise the same as in Fig. 1. In this case a resistor 25 is interposed in the charging circuit to control the charging rate.

In the case of a telephone system, where energy to operate the instruments is drawn from the charging-circuit of a battery, the slight fluctuations of E. M. F. due to rectified alternating current, or to commutation in a direct-current generator, may cause a hum in the telephone receivers unless a sufficient amount of inductance is interposed in the charging circuit to smooth out these fluctuations. An incidental advantage of the system just described resides in the fact that the winding of the signal relay 7 furnishes such inductance, so that no further provision for this purpose is necessary.

The invention claimed is:

1. In a battery-charging system, the combination, with a battery, of automatic means for connecting the battery with a source of energy, for charging the battery, upon the occurrence of a predetermined minimum E. M. F. across the battery terminals; a signal; and means for operating the signal upon the simultaneous occurrence of said minimum E. M. F. and failure of current in the charging circuit.

2. A battery-charging system comprising a battery, means for connecting the battery automatically with a source of energy, and means for indicating a failure in the supply of energy, said means including: a relay responsive to the E. M. F. across the battery terminals, a second relay having a winding energized by charging current flowing through the battery, a signal, and connections, from the battery through the contacts of the two relays to the signal, whereby the signal is energized upon the occurrence of a minimum E. M. F. in the battery accompanied by failure of current in the charging circuit of the battery.

JAMES R. DEWAR.